(12) United States Patent
Headley

(10) Patent No.: US 8,474,014 B2
(45) Date of Patent: Jun. 25, 2013

(54) METHODS FOR THE SECURE USE OF ONE-TIME PASSWORDS

(75) Inventor: Paul Headley, Hollister, CA (US)

(73) Assignee: Veritrix, Inc., Palo Alto, CA (US)

( * ) Notice: Subject to any disclaimer, the term of this patent is extended or adjusted under 35 U.S.C. 154(b) by 71 days.

(21) Appl. No.: 13/211,230

(22) Filed: Aug. 16, 2011

(65) Prior Publication Data

US 2013/0047223 A1    Feb. 21, 2013

(51) Int. Cl.
    *H04L 9/32* (2006.01)

(52) U.S. Cl.
    USPC .................................... 726/2; 726/3; 726/4

(58) Field of Classification Search
    USPC .................. 726/1–7, 10; 713/150, 154, 156, 713/162, 168–171, 176; 380/270, 44
    See application file for complete search history.

(56) References Cited

U.S. PATENT DOCUMENTS

| | | | |
|---|---|---|---|
| 5,033,088 A | 7/1991 | Shipman |
| 5,805,674 A | 9/1998 | Anderson, Jr. |
| 5,841,870 A | 11/1998 | Fieres et al. |
| 5,958,016 A | 9/1999 | Chang et al. |
| 6,009,442 A | 12/1999 | Chen et al. |
| 6,021,491 A | 2/2000 | Renaud |
| 6,256,630 B1 | 7/2001 | Gilai et al. |
| 6,262,732 B1 | 7/2001 | Coleman et al. |
| 6,446,210 B1 | 9/2002 | Borza |
| 6,480,304 B1 | 11/2002 | Os et al. |
| 6,480,825 B1 | 11/2002 | Sharma et al. |
| 6,496,206 B1 | 12/2002 | Mernyk et al. |
| 6,496,595 B1 | 12/2002 | Puchek et al. |
| 6,501,966 B1 | 12/2002 | Bareis et al. |
| 6,519,561 B1 | 2/2003 | Farrell et al. |
| 6,529,885 B1 | 3/2003 | Johnson |
| 6,581,042 B2 | 6/2003 | Pare, Jr. et al. |
| 6,671,672 B1 | 12/2003 | Heck |
| 6,697,947 B1 | 2/2004 | Matyas, Jr. et al. |
| 6,766,295 B1 | 7/2004 | Murveit et al. |
| 6,778,644 B1 | 8/2004 | Jenkins et al. |
| 6,819,219 B1 | 11/2004 | Bolle et al. |

(Continued)

FOREIGN PATENT DOCUMENTS

| | | |
|---|---|---|
| CA | 2278549 A1 | 7/1998 |
| CA | 2399961 A1 | 4/1999 |

(Continued)

OTHER PUBLICATIONS

International Search Report and Written Opinion, PCT/US09/43363 (May 8, 2009), dated Jul. 16, 2009.

(Continued)

*Primary Examiner* — Hosuk Song
(74) *Attorney, Agent, or Firm* — Peters Verny, LLP

(57) ABSTRACT

Methods for authentication over unsecure networks using one-time passwords methods are provided. The methods establish a connection over a first channel between an authentication system and a user's computing system, then the authentication system determines information based on the connection over the first channel, such as the IP address and other information that can be readily found once the IP address is known. The information derived from the connection is then provided to the user over a second channel, and the user is given an opportunity to review the information before deciding whether to continue the login. If the information returned to the user over the second channel is suspicious, this can indicate to the user that the connection over the first channel has been compromised.

34 Claims, 3 Drawing Sheets

U.S. PATENT DOCUMENTS

| | | | |
|---|---|---|---|
| 6,886,095 B1 * | 4/2005 | Hind et al. ................... 713/168 | |
| 6,907,408 B2 | 6/2005 | Angel | |
| 6,934,858 B2 | 8/2005 | Woodhill | |
| 6,944,772 B2 | 9/2005 | Dozortsev | |
| 6,993,166 B2 | 1/2006 | Lo et al. | |
| 7,171,694 B1 | 1/2007 | Jespersen et al. | |
| 7,240,363 B1 | 7/2007 | Ellingson | |
| 7,277,891 B2 | 10/2007 | Howard et al. | |
| 7,305,700 B2 | 12/2007 | Boynton et al. | |
| 7,319,987 B1 | 1/2008 | Hoffman et al. | |
| 7,333,635 B2 | 2/2008 | Tsantes et al. | |
| 7,334,259 B2 | 2/2008 | Haala | |
| 7,349,557 B2 | 3/2008 | Tibor | |
| 7,352,868 B2 | 4/2008 | Hawkes et al. | |
| 7,383,572 B2 | 6/2008 | Rolfe | |
| 7,461,258 B2 | 12/2008 | Rolfe | |
| 7,522,751 B2 | 4/2009 | White et al. | |
| 7,545,961 B2 | 6/2009 | Ahern et al. | |
| 7,545,962 B2 | 6/2009 | Peirce et al. | |
| 7,617,522 B2 * | 11/2009 | Schmidt et al. ................... 726/2 | |
| 7,634,662 B2 | 12/2009 | Monroe | |
| 7,647,498 B2 * | 1/2010 | Brown et al. ................. 713/168 | |
| 7,676,439 B2 | 3/2010 | Tattan et al. | |
| 7,685,629 B1 | 3/2010 | White et al. | |
| 7,689,833 B2 | 3/2010 | Lange | |
| 7,690,032 B1 | 3/2010 | Peirce | |
| 7,698,322 B1 | 4/2010 | Langley | |
| 7,702,918 B2 | 4/2010 | Tattan et al. | |
| 7,788,730 B2 | 8/2010 | Dean et al. | |
| 7,797,545 B2 | 9/2010 | Adams et al. | |
| 7,835,548 B1 | 11/2010 | Langley | |
| 7,865,449 B2 | 1/2011 | Tattan et al. | |
| 7,865,937 B1 | 1/2011 | White et al. | |
| 7,941,380 B2 | 5/2011 | Tattan et al. | |
| 7,987,495 B2 | 7/2011 | Maler et al. | |
| 8,006,291 B2 | 8/2011 | Headley et al. | |
| 2002/0129251 A1 | 9/2002 | Itakura et al. | |
| 2002/0152179 A1 | 10/2002 | Racov | |
| 2002/0174347 A1 | 11/2002 | Ting | |
| 2003/0005326 A1 | 1/2003 | Flemming | |
| 2003/0140235 A1 | 7/2003 | Immega et al. | |
| 2003/0163739 A1 | 8/2003 | Armington et al. | |
| 2003/0236978 A1 | 12/2003 | Evans et al. | |
| 2004/0158723 A1 | 8/2004 | Root | |
| 2005/0091338 A1 | 4/2005 | de la Huerga | |
| 2005/0114705 A1 | 5/2005 | Reshef et al. | |
| 2006/0021009 A1 | 1/2006 | Lunt | |
| 2006/0041755 A1 | 2/2006 | Pemmaraju | |
| 2006/0129821 A1 | 6/2006 | Zugenmaier et al. | |
| 2006/0136219 A1 | 6/2006 | Wang | |
| 2006/0136744 A1 | 6/2006 | Lange | |
| 2006/0184800 A1 | 8/2006 | Rosenberg | |
| 2006/0212717 A1 | 9/2006 | Ito et al. | |
| 2006/0245619 A1 | 11/2006 | Sathath | |
| 2007/0055517 A1 | 3/2007 | Spector | |
| 2007/0061590 A1 | 3/2007 | Boye et al. | |
| 2007/0107016 A1 | 5/2007 | Angel et al. | |
| 2007/0107017 A1 | 5/2007 | Angel et al. | |
| 2007/0107021 A1 | 5/2007 | Angel et al. | |
| 2007/0136573 A1 | 6/2007 | Steinberg | |
| 2007/0169182 A1 | 7/2007 | Wolfond et al. | |
| 2007/0175986 A1 | 8/2007 | Petrone et al. | |
| 2007/0198435 A1 | 8/2007 | Siegal et al. | |
| 2007/0226516 A1 | 9/2007 | Kubota et al. | |
| 2007/0226787 A1 | 9/2007 | Maletsky et al. | |
| 2008/0052527 A1 | 2/2008 | Siedlarz | |
| 2008/0077524 A1 | 3/2008 | Greene | |
| 2008/0077525 A1 | 3/2008 | Willey et al. | |
| 2008/0077526 A1 | 3/2008 | Arumugam | |
| 2008/0086319 A1 | 4/2008 | Berger | |
| 2008/0086764 A1 | 4/2008 | Kulkarni et al. | |
| 2008/0091618 A1 | 4/2008 | Obrea et al. | |
| 2008/0113786 A1 | 5/2008 | Alderucci et al. | |
| 2008/0141353 A1 | 6/2008 | Brown | |
| 2009/0052745 A2 | 2/2009 | Sathath | |
| 2009/0116703 A1 | 5/2009 | Schultz | |
| 2009/0119299 A1 | 5/2009 | Rhodes | |
| 2009/0164796 A1 | 6/2009 | Peirce | |
| 2009/0259588 A1 | 10/2009 | Lindsay | |
| 2009/0313165 A1 | 12/2009 | Walter | |
| 2010/0029196 A1 | 2/2010 | Tan | |
| 2010/0039218 A1 | 2/2010 | Cohen et al. | |
| 2010/0107230 A1 | 4/2010 | Tyagi et al. | |
| 2010/0312763 A1 | 12/2010 | Peirce | |
| 2011/0035788 A1 | 2/2011 | White et al. | |
| 2011/0185405 A1 | 7/2011 | Ganesan | |
| 2011/0209200 A2 | 8/2011 | White et al. | |
| 2011/0231911 A1 | 9/2011 | White et al. | |

FOREIGN PATENT DOCUMENTS

| | | | |
|---|---|---|---|
| EP | 1868131 A1 | 12/2007 | |
| GB | 2379040 A | 2/2003 | |
| WO | 0156352 A2 | 8/2001 | |
| WO | 2009032036 A2 | 3/2009 | |
| WO | 2009127984 A1 | 10/2009 | |
| WO | 2010096628 A2 | 8/2010 | |

OTHER PUBLICATIONS

International Search Report and Written Opinion, PCT/US09/47049 (Jun. 11, 2009), dated Sep. 1, 2009.

International Search Report and Written Opinion, PCT/US09/48842 (Jun. 26, 2009), dated Aug. 3, 2009.

International Search Report and Written Opinion, PCT/US09/62490 (Oct. 29, 2009), dated Dec. 14, 2009.

International Search Report and Written Opinion, PCT/US11/58974 (Nov. 2, 2011), dated Mar. 16, 2012.

Vince Thomas et al., "Learning to Predict Gender from Iris Images," First IEEE International Conference on Biometrics: Theory, Applications, and Systems, Sep. 2007.

Jain et al., Soft Biometric Traits for Personal Recognition Systems, http://www.springerlink.com/content/5gg1c23821cevbnk/.

Ambalakat, Security of Biometric Authentication Systems, 2005, http://www.ewp.rpl.edu/hartford/~rhb/cs_seminar_2005/SessionA1/ambalakat.pdf.

EPO 09 747 255.9 European Supplementary Search Report, Jun. 28, 2012.

Chenafa, M. et al., "Biometric System Based on Voice Recognition Using Multiclassifiers, Biometrics and Identity Management," Springer Berlin, pp. 206-215, May 5, 2008.

U.S. Appl. No. 13/413,578, Paul Headley, Systems and Methods for Controlling Access to Encrypted Data Stored on a Mobile Device, filed Mar. 6, 2012.

U.S. Appl. No. 12/137,129, Paul Headley, Single-Channel Multi-Factor Authentication, filed Jun. 11, 2008.

U.S. Appl. No. 13/213,029, Paul Headley, Multi-Channel Multi-Factor Authentication, filed Aug. 18, 2011.

U.S. Appl. No. 12/942,248, Paul Headley, Methods for Identifying the Guarantor of an Application, filed Nov. 9, 2010.

U.S. Appl. No. 13/213,035, Paul Headley, Multi-Channel Multi-Factor Authentication, filed Aug. 18, 2011.

U.S. Appl. No. 13/683,940, Paul Headley, Multi-Channel Multi-Factor Authentication, filed Nov. 21, 2012.

U.S. Appl. No. 13/442,232, Paul Headley, User Authentication for Social Networks, filed Apr. 9, 2012.

U.S. Appl. No. 13/469,568, Paul Headley, Methods for Thwarting Man-In-The-Middle Authentication Hacking, filed Jun. 15, 2012.

EP 12180301.9 Extended European Search Report, dated Dec. 6, 2012.

Tan, T. G., "Phising Redefined—Preventing Man-in-the-Middle Attacks for Web-based Transactions," http://www.dssasia.com, Mar. 2005.

* cited by examiner

METHODS FOR THE SECURE USE OF ONE-TIME PASSWORDS

CROSS-REFERENCE TO RELATED APPLICATIONS

This application is related to U.S. patent application Ser. No. 12/119,617 filed May 13, 2008 and entitled "Multi-Channel Multi-Factor Authentication," and to U.S. patent application Ser. No. 12/137,129 filed Jun. 11, 2008 and entitled "Single-Channel Multi-Factor Authentication," both of which are incorporated herein by reference.

BACKGROUND OF THE INVENTION

1. Field of the Invention

The present invention relates generally to the field of authentication and more particularly to the use of one-time passwords over unsecure networks.

2. Related Art

A one-time password (OTP) is a password that is valid for only one login session or transaction, as opposed to a static password that may be used repeatedly. A cybercriminal that manages to record an OTP as it is being used will not be able to reuse it to access the secured account since the OTP will be no longer valid. Since OTPs are not memorized and reused, OTPs must be generated in some secure fashion so that the person seeking a login session or transaction has access to the OTP that the host computing system is expecting.

In some systems, an OTP is generated by the host computing system, transmitted over a first channel, such as to a cellular phone using Short Message Service (SMS), and returned to the host computing system over a second channel, such as from a PC connected to the Internet. In other systems the person retains a physical device, known in the art as a token that is synchronized with the host computing system in some way, though they do not communicate. For instance, both can employ the same algorithm to generate the OTP based on the time and date as a seed. In both types of systems the use of the OTP can be time-limited; the OTP sent by the host computing system can be valid for only a short duration after transmission, and the OTP generated by the token can be valid only until a certain time.

Both authentication systems are considered two factor authentication systems where the factors are (1) something the user knows, specifically the OTP, and something the user has, either a token or a receiving device like a cellular phone. Because two-factor authentication additionally involves something the user has and, it is assumed, the criminal does not, two factor authentication is widely accepted to be more secure than conventional passwords.

Despite the security advantages of OTPs, two-factor methods employing OTPs can be defeated when used over unsecured networks. FIG. 1 illustrates two methods used by cybercriminals. Gaining access to the user's account starts by duping a user 100, employing a user computing system 110 having access to an unsecured network 120 such as the Internet, into accessing a criminally controlled website served by a criminal computing system 130. That website provides a login page that closely resembles the login page provided by a legitimate authentication computing system 140.

If the user 100 is fooled into believing that the website served by the criminal computing system 130 is actually that of the authentication computing system 140, the user 100 will attempt to login and unwittingly send a user ID to the criminal computing system 130. In those instances where the user 100 possesses a token 150, the user 100 will also provide the OTP with the user ID. The criminal computing system 130 then begins the login process with the user ID of the user 100. In those instances where the user 100 possesses the token 150, the criminal computing system 130 is able to complete the login to the user's account without further information from the user 100. To hide the criminal activity, the criminal computing system 130 can serve a response page back to the user computing system 110 after the user ID has been received indicating that the authentication computing system 140 is presently unavailable.

In those instances where the user 100 does not possess a token 150, the criminal computing system 130 provides the user ID to the authentication computing system 140 which generates and sends the OTP over a second channel to receiving device 160. The user 100 is expecting the OTP, and upon receipt enters the OTP into the user computing system 110 which communicates the OTP to the criminal computing system 130. The criminal computing system 130 then can complete the login to the user's account through the authentication computing system 140. As above, the criminal computing system 130 may respond with a misleading response page.

SUMMARY

The present invention provides methods, and systems that implement those methods, for authentication over unsecure networks using one-time passwords. These methods provide the user with information derived from the connection across the unsecured network and allows the user the opportunity to review this information before deciding to continue with the login process. The user can continue the login process by submitting a one-time password, in some instances. In instances where the one-time password is provided by the user before the information derived from the connection is provided to the user, the user can continue the login process by providing a response over another channel after receiving said information.

An exemplary authentication method as would be performed, for example, by a person seeking to access an account or system, comprises connecting to an authentication computing system over a first channel, submitting a request including a user ID, receiving connection verification information over a second channel from the authentication computing system, deciding to continue based on the connection verification information, and submitting a one-time password. The one-time password can be submitted either before or after deciding to continue based on the connection verification information. Where the one-time password is submitted before deciding to continue, the method can additionally comprise sending a response to continue, over a channel other than the first channel, after deciding to continue based on the connection verification information. The other channel can be the second channel, in some embodiments.

In various embodiments, connecting to the authentication computing system over the first channel includes launching an application. Receiving the connection verification information, in some embodiments, includes receiving information determined based on an IP address of the user computing system, and in some of these embodiments the information determined based on the IP address comprises a geographical location of the user computing system. In other embodiments, receiving connection verification information includes receiving information determined based on a system signature of the user computing system. Receiving connection verification information can also include receiving information determined based on both the system signature and the IP address.

In the exemplary method, receiving the connection verification information over the second channel may include receiving the connection verification information with a cellular phone. In some embodiments, the exemplary method further comprises generating the one-time password prior to submitting the one-time password. The exemplary method may further comprise receiving, with the connection verification information, a prompt to submit the one-time password.

Another exemplary authentication method, as would be performed, for example, by an authentication system, comprises accepting a connection over a first channel, where the connection characterized by an IP address of a user computing system. The method also comprises serving a login page to the IP address, receiving a request including a claimant target, and determining connection verification information. The method further comprises communicating the connection verification information over a second channel, and receiving a one-time password. The OTP may be received over the first channel, in some embodiments. In various embodiments, the one-time password is received either before or after the connection verification information is communicated. In those embodiments in which the one-time password is received before the connection verification information is communicated, the method can further comprise receiving a response to continue after communicating the connection verification information. Here, the response is received over a channel other than the first channel, such as the second channel.

In various embodiments, the connection verification information is determined based on the IP address, and in some of these embodiments determining the connection verification information includes determining a geographical location associated with the IP address and/or comparing the IP address to a prior IP address from an earlier successful login, and/or querying a domain name registrar. The exemplary method can further comprise, in some embodiments, receiving a system signature, and in these embodiments determining the connection verification information is based on the system signature and optionally also the IP address. Determining the connection verification information can also include determining other ancillary information such as an ISP identity, a WiFi hotspot identity, or a channel type, such as 3G or 4G.

In some embodiments, communicating the connection verification information over the second channel includes sending a SMS message. Communicating the connection verification information over the second channel may also include sending a prompt and/or sending the one-time password. In those embodiments where communicating the connection verification information includes sending the one-time password, the method can further comprise generating the one-time password. Various embodiments of the exemplary method further comprise querying a database using the claimant target to determine a device address for communicating the connection verification information over the second channel.

The present invention also provides authentication system comprising an authentication server. The authentication server is configured to accept a connection to an IP address over a first channel, serve a login page to the IP address, receive a request including a claimant target from the IP address, and determine connection verification information. The authentication server is also configured to communicate the connection verification information over a second channel to a device address associated with the claimant target, and receive a one-time password. The authentication server is further configured to generate the one-time password and/or further configured to communicate the one-time password with the connection verification information over the second channel to the device address. In various embodiments of the authentication system, the authentication server is configured to determine the connection verification information based on the IP address. In other embodiments the authentication server is configured to receive a system signature and to determine the connection verification information based on system signature and optionally also based on the IP address.

In various embodiments, the authentication server is configured to receive the one-time password with the request including the claimant target and is further configured to receive a response over a channel other than the first channel after communicating the connection verification information. In the alternative, the authentication server is configured to receive the one-time password after communicating the connection verification information over the second channel.

DETAILED DESCRIPTION OF THE INVENTION

The present invention is directed to the secure use of OTPs over unsecured networks 120. According to methods of the present invention, whenever a user 100 initiates a login over a first channel, the user 100 receives a notification over an out-of-band (OOB) channel. The notification includes connection verification information to verify the connection to the user 100 before the user 100 provides the OTP. If the user 100 is duped into accessing a criminal computing system 130, the connection verification information will show the user 100 an obvious discrepancy between the actual connection and the perceived connection. For example, if a user 100 in Tampa were to access the authentication computing system 140 by way of a criminal computing system 130 located in Kiev, the user 100 could receive a notification over the second channel reporting that the login is being attempted from Kiev and would know not to complete the login procedure.

Figure 1:
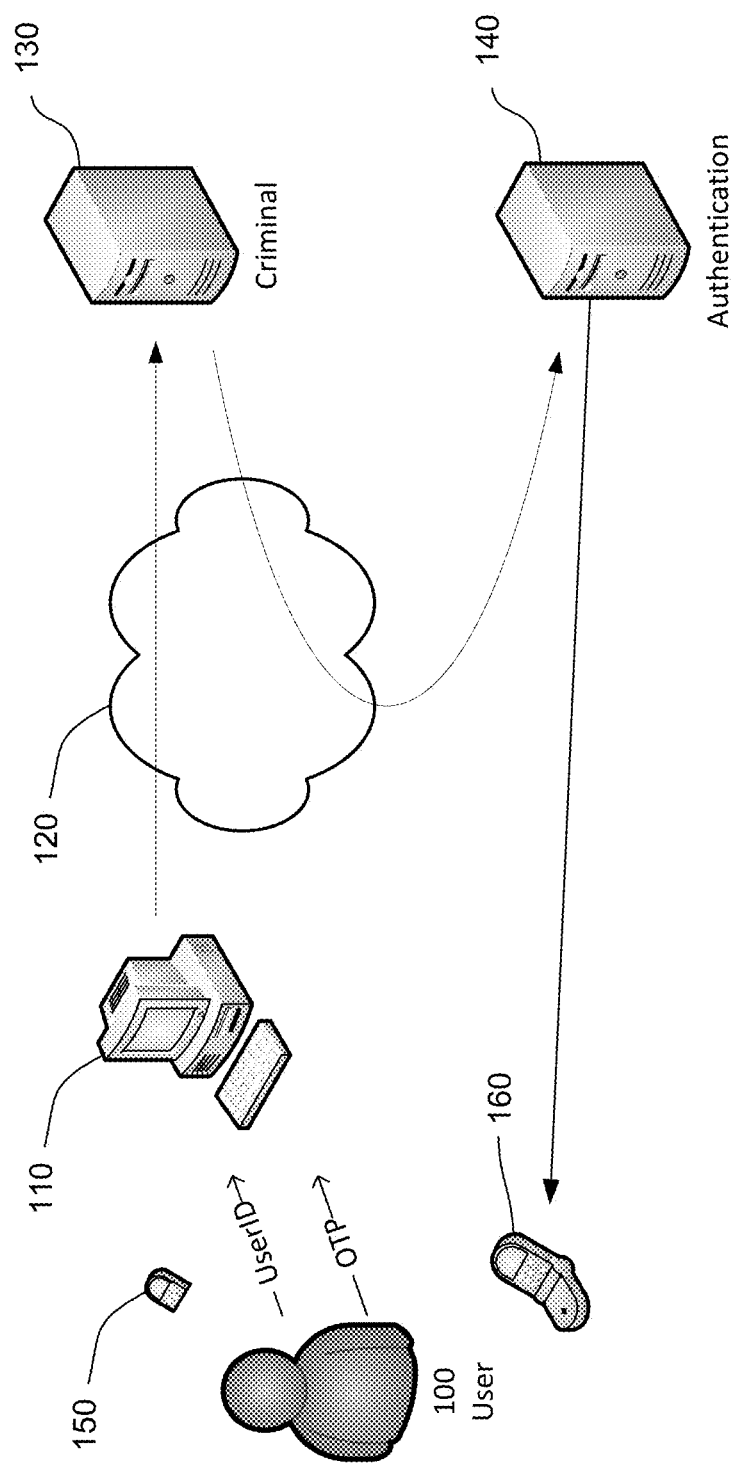
FIG. 1 is a schematic representation of how one-time passwords can be circumvented according to the prior art.
Figure 2:
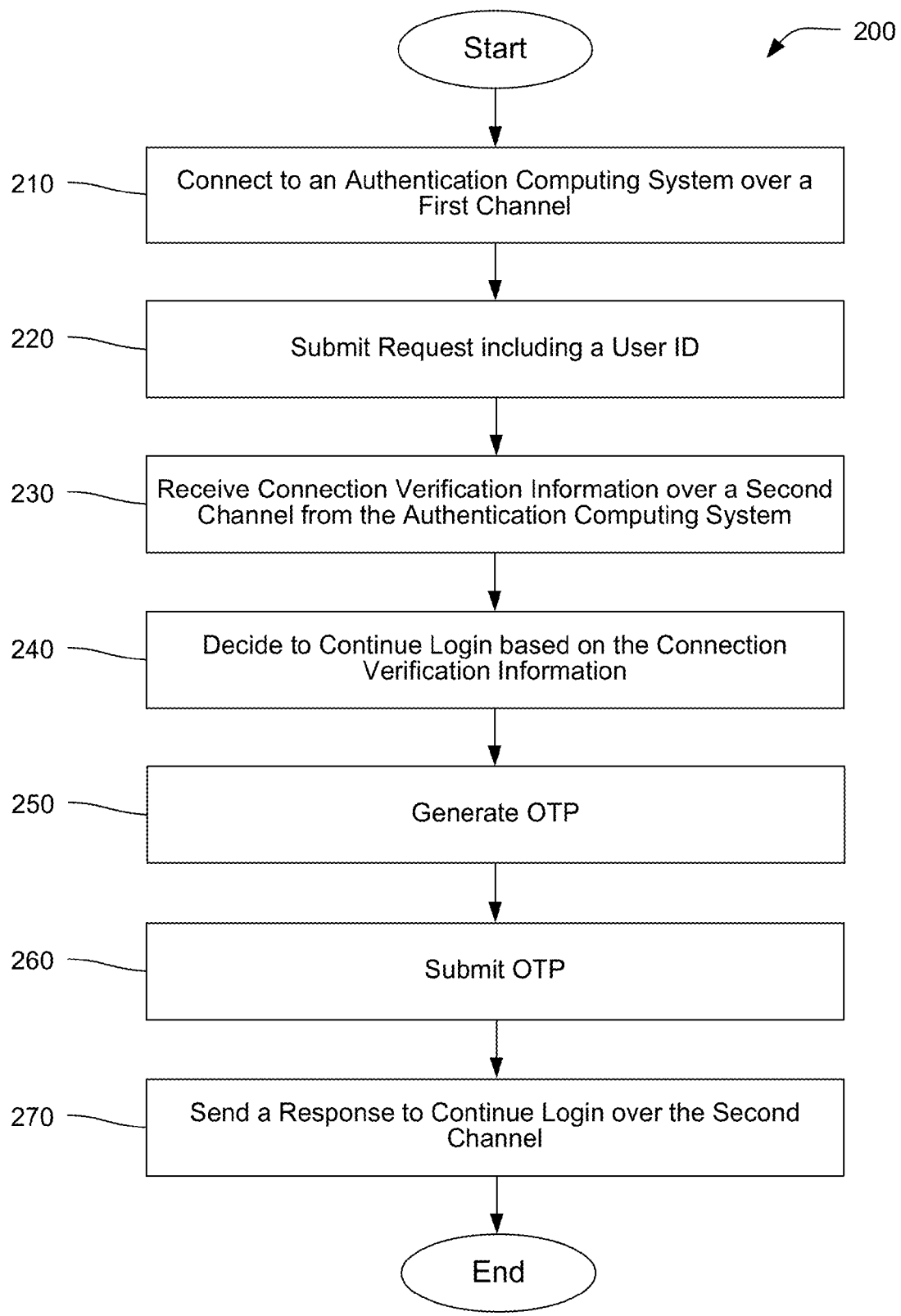
FIG. 2 is a flowchart representation of an authentication method according to an exemplary embodiment of the present invention.
Figure 3:
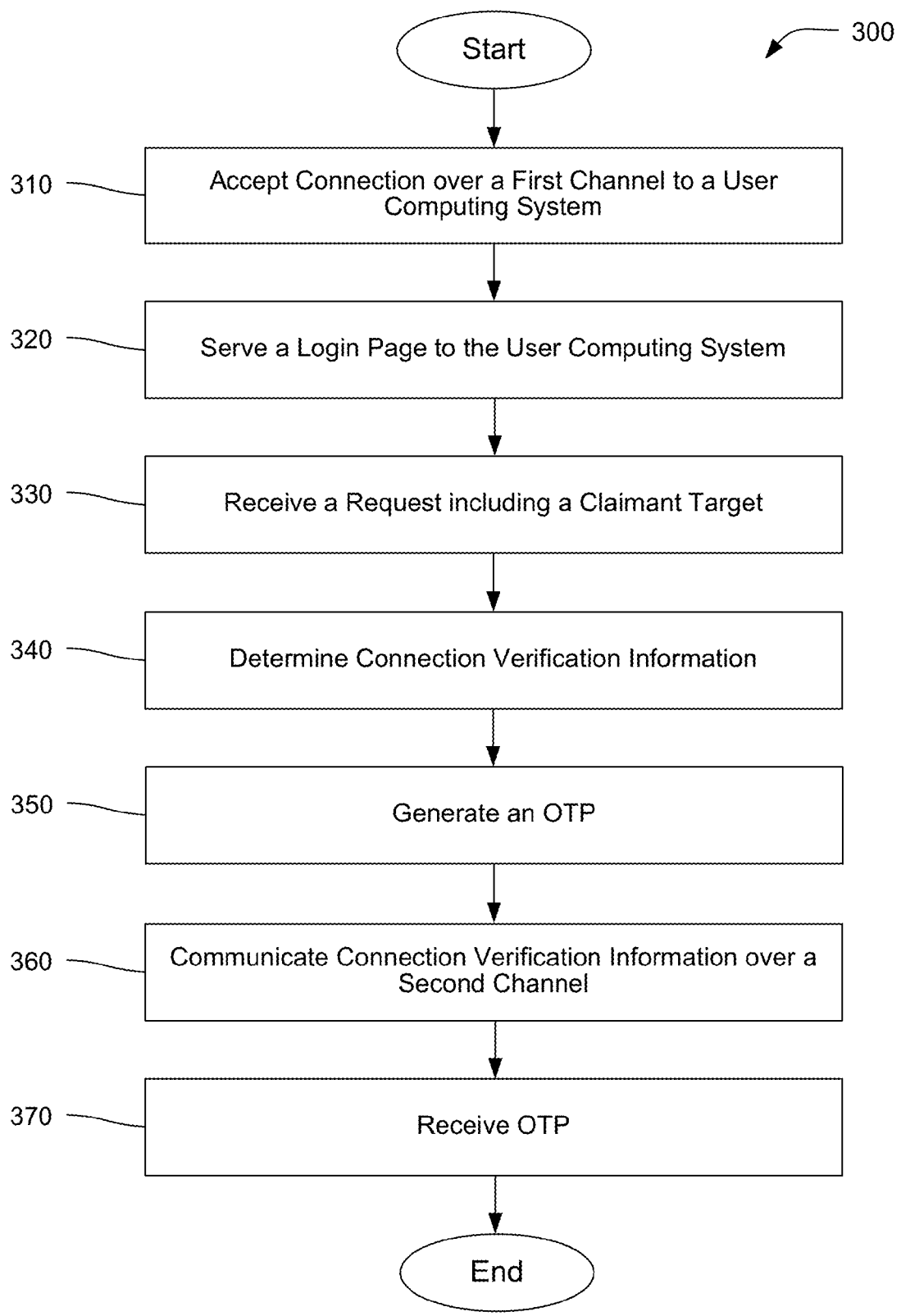
FIG. 3 is a flowchart representation of an authentication method according to another exemplary embodiment of the present invention.

FIG. 2 illustrates an exemplary method 200 of the present invention that can be performed, for example, by the user 100 to access a system or an account. FIG. 3 illustrates a corresponding exemplary method 300 that can be performed, for example, by the authentication computing system 140 to authenticate the user 100 during a login attempt. The authentication computing system 140 comprises one or more servers and databases.

The method 200 begins with a step 210 of connecting the user computing system 110 to the authentication computing system 140 over a first channel such as over an unsecured network 120. The user computing system 110 can be an unsecured device such as a cellular phone, a personal computer (PC), a tablet computing device, a gaming console, for instance. In the case of an application on a platform such as iOS, the mobile operating system provided by Apple, Inc., the user 100 may perform step 210 by launching the application, whereupon the application automatically establishes the connection between the user computing system 110 and the authentication computing system 140. Where an application is implemented through a browser running on the user computing system 110, the user 100 may perform step 210 by entering a URL in the browser address line.

Turning to FIG. 3, the method 300 begins with the authentication computing system 140 accepting the connection over the first channel between the user computing system 110 and the authentication computing system 140 in a step 310. In response, in a step 320, the authentication computing system 140 serves a login page from which the user 100 can submit a request for access. For instance, the login page can include a text box for entering a user ID such as an e-mail address, phone number, user name, or other personal identifier. As user herein, a person seeking to be authenticated may alternatively be referred to as a claimant, and the claimant will submit a claimant target as the user ID.

Returning to method 200, after connecting the user computing system 110 to the authentication computing system 140 in step 210, the user computing system 110 receives a login page from the authentication computing system 140. In a step 220 the user 100 submits a request including the user ID to the authentication computing system 140. The step 220 can be performed, for example, by the user 100 entering a user ID into a text box on the login page and then pressing the return key, or by then selecting an appropriate button on the login page.

Returning to method 300, after serving the login page in step 320, the authentication computing system 140 in a step 330 receives a request including a claimant target. In a step 340 the authentication computing system 140 determines connection verification information. As used herein, connection verification information is information gleaned from the connection and from which the user 100 can readily ascertain whether the connection is secure or possibly compromised. In some embodiments, step 340 precedes step 330 as the request is not necessarily required to make the determination of step 340. As one example, the information determined in step 340 can simply be the Internet Protocol (IP) address of the user computing system 110 which is known from step 310 and which allows the authentication computing system 140 to route the login page in step 320.

Although the IP address may be sufficient in some embodiments of method 300, in other embodiments further connection verification information is determined in step 340. For instance, using the claimant target, the authentication computing system 140 can compare the IP address of the user computing system 110 with the IP addresses of prior logins for the same claimant target to determine whether the IP address of the user computing system 110 is the same or different as compared to prior logins. As another example, a geographical location can be determined for the user computing system 110 based on the IP address. The IP address 173.16.176.103 is associated with the location Clearlake, Calif., for instance. Still further connection verification information can be determined from the IP address, in some embodiments. Every IP address is registered to some lessee known as the Internet Service Provider (ISP). Domain name registrars maintain records of such information and the records can be queried to determine ancillary information such as the identity of the ISP. Connection verification information including the geographic location can be obtained through on-line resources for reverse DNS lookup such as http://www.lookupip.com/or http://ip-lookup.net, etc. Other ancillary information can comprise a channel type like 3G or 4G or the identity of a WiFi hotspot.

Still other connection verification information can be determined in step 340 from a system signature of the user computing system 110. For instance, the user computing system 110 can include installed signature generating software to provide a system signature to the authentication computing system 140. The system signature may include or be generated based upon, among other things, the CPU serial number, BIOS version, install date of the signature generating software, etc.

The system signature can be sent any time prior to generating the connection verification information in step 340. In some embodiments, the system signature is sent in step 210. For example, in those embodiments in which an application automatically establishes the connection between the user computing system 110 and the authentication computing system 140, the application can include the signature generating software and can transmit the system signature in the process of creating the first channel connection. In other embodiments, the system signature is transmitted in step 220 when the user 100 submits the user ID to the authentication computing system 140. The signature can be passed as a parameter in the http request in step 210, or as part of the data in the case of a thick client in either step 210 or 220. In some embodiments, the login page that is served in step 320 may begin with a JavaScript, or by loading a swf, or by activating a plug-in. "On load" the JavaScript, swf, plug-in, etc. sends the system signature to the authentication computing system 140 with a request for the login form that is displayed to the user through the browser to receive the user ID.

In these embodiments, connection verification information is determined in step 340 based on the received system signature. For example, the received system signature can be compared to the prior system signature or to a list of trusted system signatures. If the received system signature did not match a prior system signature, or was absent, then the connection verification information would be the system signature abnormality.

In an optional step 350 the authentication computing system 140 generates an OTP. This step may be performed even before the step 310 of accepting the connection over the first channel. In a step 360, performed after step 340, at least some of the connection verification information determined in step 340 is communicated over a second channel to the user's receiving device 160. As one example, the connection verification information can be sent in an SMS message to a cellular phone. Exemplary messages include "You are attempting to login from IP address 173.16.176.103," "We see your login coming to us today from Clearlake, Calif.," "Our records indicate that this is the first time you have attempted to login from the present address," and "Are you logging in from a new computer? Your system's signature is new." Such messages can also include a warning to discontinue the login if the connection verification information is incorrect. It will be appreciated that step 360 can include using the claimant target to query a database to determine a device address for the receiving device 160.

In some embodiments, in step 360, a prompt is also communicated over the second channel to the user's receiving device 160, and in various embodiments the prompt includes the connection verification information or accompanies the connection verification information determined in step 340. For example, the prompt can supply the OTP generated in step 350. For instance, the prompt can be "Please enter Code XXXXXXX if you are logging in today from Clearlake, Calif." It is noted that step 360 can comprise sending more than one communication to the receiving device 160 in some embodiments. Thus, for example, the connection verification information can be provided in a first SMS message while the OTP follows in a second SMS message. Step 360 optionally can include refreshing the login page served in step 320 to include a text box for entering the OTP. In this way a user 100 with a token 150 cannot enter the OTP generated by the token 150 until the connection verification information has been communicated in step 360.

The method 300 can also include the step 370 of the authentication computing system 140 receiving the OTP. In various embodiments the OTP is received over the first channel, but in alternative embodiments the OTP is received over the second or a third channel. Assuming the received OTP matches the expected OTP, and is received within an established timeout period, if one is imposed, then the claimant is recognized as the user 100 and allowed access.

Returning to the method 200, in a step 230 the user 100 receives connection verification information over the second channel from the authentication computing system 140. As noted with respect to method 300, the connection verification information can be presented alone or in combination with a warning, a prompt, and/or an OTP. Next, in a step 240 the user 100 decides to continue the login based on the received information. It will be appreciated that the method 200 can alternately end at this point by the user 100 deciding not to continue the login because the connection verification information suggests to the user 100 that an attempt to compromise the security of the authentication is occurring.

In an optional step 250, the user 100 generates the OTP using the token 150, for example. In some embodiments, the token 150 is also the receiving device 160. In some of these embodiments, the OTP cannot be generated until after the connection verification information in step 230 is received. In embodiments of method 200 that do not include step 250, the user 100 receives the OTP in step 230 from the authentication computing system 140. This could be done in reverse order. . . . For instance the userID and OTP can be entered and the "location" verified in the next step.

In a step 260 the user 100 submits the OTP. As noted, in some embodiments the OTP is entered through the login page and transmitted over the first channel, while in other embodiments the OTP is communicated over the second or over a third channel. Assuming the user 100 transcribes the OTP correctly, and within an established timeout period, if any, then the user 100 receives access.

In still further embodiments, steps 220 and 260 occur contemporaneously, for example, the user 100 submits the user ID and OTP together in response to the login page, however, the authentication computing system 140 does not permit access until the user 100 confirms the login through the second channel until after the user 100 has had the opportunity to decide to continue based on the provided connection verification information. In these embodiments, the user 100 may possess a token 150, which again could be the receiving device 160. In these embodiments, in the step 230, the user 100 receives the connection verification information over the second channel, as in previously described embodiments. Then, in a step 270 of method 200, the user 100 sends a response to continue the login over the second channel. In step 230, in some instances, the message that provides the connection verification information over the second channel also prompts the user 100 to verify the login based on the connection verification information. For example, the message can be "If this is the first time you have attempted to login from this computer, and you are logging in from Kiev, please send a reply to this message."

In these embodiments, method 300 is also different than in the previously described embodiments. Here, steps 330 and 370 occur contemporaneously with the claimant target and OTP received together, for example. Then, in step 360, the connection verification information is communicated over the second channel and a response to continue is received in response from the receiving device 160. The indication from the user 100 received over the second channel that the connection verification information is correct allows the authentication computing system 140 to permit access over the first channel. It is noted that the response over the second channel can take various forms, and can alternatively be over a third channel. For example, the user could be prompted to send a text message to confirm to another phone number. In other embodiments, the message includes a link to another website served by the authentication computing system 140 and when the receiving device 160 displays this website the user 100 can click a radio button, check a box, enter a code, or otherwise indicate that the verification information is correct.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. An authentication method comprising:
   connecting to an authentication server over a first channel;
   submitting a request including a user ID;
   receiving connection verification information over a second channel from the authentication server;
   deciding to continue based on the connection verification information; and
   submitting a one-time password.

2. The method of claim 1 wherein connecting to the authentication server over the first channel includes launching an application.

3. The method of claim 1 wherein receiving connection verification information includes receiving information determined based on an IP address of the user computing system.

4. The method of claim 3 wherein the information determined based on the IP address comprises a geographical location of the user computing system.

5. The method of claim 1 wherein receiving connection verification information includes receiving information determined based on a system signature of the user computing system.

6. The method of claim 1 wherein receiving the connection verification information over the second channel includes receiving the connection verification information with a cellular phone.

7. The method of claim 1 further comprising generating the one-time password prior to submitting the one-time password.

8. The method of claim 1 further comprising receiving, with the connection verification information, a prompt to submit the one-time password.

9. The method of claim 1 wherein submitting the one-time password is performed after deciding to continue based on the connection verification information.

10. The method of claim 1 wherein submitting the one-time password is performed before deciding to continue based on the connection verification information.

11. The method of claim 10 further comprising sending a response to continue, over a channel other than the first channel, after deciding to continue based on the connection verification information.

12. An authentication method comprising:
  accepting a connection over a first channel, the connection characterized by an IP address of a user computing system;
  serving a login page to the IP address;
  receiving a request including a claimant target;
  determining connection verification information;
  communicating the connection verification information over a second channel; and
  receiving a one-time password.

13. The method of claim 12 wherein determining the connection verification information is performed based on the IP address.

14. The method of claim 13 wherein determining the connection verification information includes determining a geographical location associated with the IP address.

15. The method of claim 13 wherein determining connection verification information includes comparing the IP address to a prior IP address from an earlier successful login.

16. The method of claim 13 wherein determining connection verification information includes querying a domain name registrar.

17. The method of claim 12 further comprising receiving a system signature, wherein determining the connection verification information is based on the system signature.

18. The method of claim 12 wherein communicating the connection verification information over the second channel includes sending a SMS message.

19. The method of claim 12 wherein communicating the connection verification information over the second channel includes sending a prompt.

20. The method of claim 12 wherein communicating the connection verification information over the second channel includes sending the one-time password.

21. The method of claim 20 further comprising generating the one-time password.

22. The method of claim 12 further comprising querying a database using the claimant target to determine a device address for communicating the connection verification information over the second channel.

23. The method of claim 12 wherein the OTP is received over the first channel.

24. The method of claim 12 wherein the one-time password is received after the connection verification information is communicated.

25. The method of claim 12 wherein the one-time password is received before the connection verification information is communicated.

26. The method of claim 15 further comprising receiving, over a channel other than the first channel, a response to continue after communicating the connection verification information.

27. The method of claim 12 wherein determining the connection verification information includes determining an ISP identity, a channel type, or a WiFi hotspot identity.

28. An authentication system comprising:
  an authentication server configured to
    accept a connection to an IP address over a first channel;
    serve a login page to the IP address;
    receive a request including a claimant target from the IP address;
    determine connection verification information;
    communicate the connection verification information over a second channel to a device address associated with the claimant target; and
    receive a one-time password.

29. The authentication system of claim 28 wherein the authentication server is further configured to generate the one-time password.

30. The authentication system of claim 29 wherein the authentication server is further configured to communicate the one-time password with the connection verification information over the second channel to the device address.

31. The authentication system of claim 29 wherein the authentication server is configured to determine the connection verification information based on the IP address.

32. The authentication system of claim 29 wherein the authentication server is configured to receive a system signature and to determine the connection verification information based on system signature.

33. The authentication system of claim 29 wherein the authentication server is configured to receive the one-time password with the request including the claimant target and further configured to receive a response over a channel other than the first channel after communicating the connection verification information.

34. The authentication system of claim 29 wherein the authentication server is configured to receive the one-time password after communicating the connection verification information over the second channel.

* * * * *